US012116815B2

(12) United States Patent
Formenti

(10) Patent No.: US 12,116,815 B2
(45) Date of Patent: Oct. 15, 2024

(54) DEVICE FOR SUPPORTING AND MOVING FURNITURE DOORS

(71) Applicant: Formenti & Giovenzana S.p.A., Veduggio con Colzano (IT)

(72) Inventor: Leonardo Formenti, Veduggio con Colzano (IT)

(73) Assignee: Formenti & Giovenzana S.p.A., Veduggio con Colzano (IT)

(*) Notice: Subject to any disclaimer, the term of this patent is extended or adjusted under 35 U.S.C. 154(b) by 0 days.

(21) Appl. No.: 18/254,624

(22) PCT Filed: Nov. 26, 2021

(86) PCT No.: PCT/IB2021/061018
§ 371 (c)(1),
(2) Date: May 26, 2023

(87) PCT Pub. No.: WO2022/113021
PCT Pub. Date: Jun. 2, 2022

(65) Prior Publication Data
US 2024/0018816 A1 Jan. 18, 2024

(30) Foreign Application Priority Data
Nov. 26, 2020 (IT) ........................ 102020000028622

(51) Int. Cl.
*E05D 15/40* (2006.01)
*E05D 3/16* (2006.01)
(Continued)

(52) U.S. Cl.
CPC ............. *E05D 15/401* (2013.01); *E05D 3/16* (2013.01); *E05F 1/10* (2013.01); *E05F 1/1058* (2013.01);
(Continued)

(58) Field of Classification Search
CPC ........... E05D 15/401; E05D 1/10; E05D 3/16; E05D 2003/163; E05D 2003/166;
(Continued)

(56) References Cited

U.S. PATENT DOCUMENTS

| | | | | |
|---|---|---|---|---|
| 5,896,619 A * | 4/1999 | Koopman | E05F 1/1253 | 16/68 |
| 6,296,337 B1 * | 10/2001 | Kawanabe | E05F 1/1075 | 312/319.2 |

(Continued)

FOREIGN PATENT DOCUMENTS

| | | |
|---|---|---|
| DE | 102 03 269 A1 | 8/2003 |
| DE | 202018104752 U1 | 11/2019 |
| EP | 2 712 988 A2 | 4/2014 |

OTHER PUBLICATIONS

Italian Search Report Corresponding to IT202000028622 mailed Aug. 11, 2021.
International Search Report Corresponding to PCT/IB2021/061018 mailed Mar. 11, 2022.
Written Opinion Corresponding to PCT/IB2021/061018 mailed Mar. 11, 2022.

*Primary Examiner* — Jeffrey O'Brien
(74) *Attorney, Agent, or Firm* — Finch & Maloney PLLC

(57) ABSTRACT

A device (1) for supporting and moving furniture doors, in particular flap doors, comprises a first fixed part (2) intended to be secured to the body of a piece of furniture (30), a second part (3) intended to be secured to a door (33), articulated connection means (4) movable in a moving plane to connect said first fixed part (2) to said second part (3), elastic means (5) suitable to act through kinematic connection means (7) on a push lever (11) of said articulated connection means (4) to push said device (1) with a predetermined elastic load toward an extended open door configuration after a first portion of the movement of said device (1) from a retracted configuration toward said extended
(Continued)

configuration, wherein said elastic means (5) and said kinematic connection means (7) lie in a plane perpendicular to said moving plane for said articulated connection means (4).

17 Claims, 21 Drawing Sheets

(51) Int. Cl.
*E05F 1/10* (2006.01)
*E05F 1/12* (2006.01)

(52) U.S. Cl.
CPC ......... *E05F 1/1261* (2013.01); *E05Y 2201/47* (2013.01)

(58) Field of Classification Search
CPC ........... E05Y 2201/47; E05Y 2201/416; E05Y 2201/422; E05Y 2201/474; E05F 1/1041; E05F 1/105; E05F 1/1058; E05F 1/1066; E05F 1/1075; E05F 1/1246; E05F 1/1253; E05F 1/1261; E05F 1/1269; E05F 1/1276
See application file for complete search history.

(56) References Cited

U.S. PATENT DOCUMENTS

| | | | | | |
|---|---|---|---|---|---|
| 7,448,703 | B2 * | 11/2008 | Kung | E05D 15/262 | |
| | | | | 312/327 | |
| 8,303,055 | B2 * | 11/2012 | Scheffknecht | E05D 15/262 | |
| | | | | 312/319.6 | |
| 8,590,107 | B2 * | 11/2013 | Omann | E05D 15/401 | |
| | | | | 16/319 | |
| 10,662,690 | B2 * | 5/2020 | Schluge | E05F 1/1253 | |
| 10,927,577 | B2 * | 2/2021 | Kruedener | E05D 5/0276 | |
| 11,319,737 | B2 * | 5/2022 | Nordieker | E05F 1/1058 | |
| 2007/0209654 | A1 * | 9/2007 | Wang | E05F 1/1276 | |
| | | | | 126/194 | |
| 2009/0261696 | A1 * | 10/2009 | Hollenstein | E06B 3/482 | |
| | | | | 312/327 | |
| 2018/0058123 | A1 * | 3/2018 | Salice | E05F 5/02 | |
| 2020/0131818 | A1 * | 4/2020 | Sobolewski | E05D 15/40 | |
| 2022/0056745 | A1 * | 2/2022 | Holzapfel | E05D 15/40 | |
| 2023/0030015 | A1 * | 2/2023 | Boesch | E05F 1/1261 | |

* cited by examiner

DEVICE FOR SUPPORTING AND MOVING FURNITURE DOORS

FIELD OF THE INVENTION

The present invention relates to a device for supporting and moving furniture doors, namely a device for moving upward opening flap doors.

For the sake of simplicity, the present description is given without limitation with particular reference to a device for supporting and guiding the opening of furniture flap doors between a closed position and an upward open position.

BACKGROUND OF THE INVENTION

In the field of furniture, either for kitchens, living rooms or offices, the possibility of having upward opening flap doors, namely for doors located at a given height from the ground, is highly requested.

In order to provide proper support to flap doors while guiding their movement between the aforementioned closed and open positions, devices are currently provided in furniture for supporting and moving the doors, which comprise multi-point articulation means which jointedly connect a first part intended to be secured to the door of the piece of furniture and a second part intended to be secured to the body of the piece of furniture.

These devices for supporting and moving the doors are also equipped with elastic means which, after supporting a first opening length of the door from the closed condition, push said articulation means with a predetermined load to assist the lifting movement of the flap door toward the open position and to keep said door in said open position against the action the weight force acting on the door.

It should be noted that, unlike the usual hinges which are suitable to allow the doors to be opened and closed by pivoting about a vertical axis, the aforementioned devices for supporting and moving the flap doors require the presence of elastic means capable of exerting rather considerable forces, since such elastic means are required to overcome the weight force of the door by pushing the articulation means of the devices using disadvantageous lever arms relative to the size of the flap doors.

This means that the elastic means of the aforementioned devices for supporting and moving the flap doors cannot be easily integrated in the body of the devices for supporting and moving the flap doors unless the overall dimensions of these devices are increased.

In particular, it should be noted that the largest and most problematic dimension of the aforementioned devices for supporting and moving the flap doors is located at the inner shoulders of the piece of furniture, therefore in the width direction of the piece of furniture, and that two opposed mechanical devices must be provided at the opposed lateral shoulders that delimit the cavity of the piece of furniture with which the closing flap door is associated.

In view of the foregoing, the need is apparently felt for devices for supporting and moving upward opening flap doors that are able to properly support and move the door of the piece of furniture, by leveraging the action of elastic means to reduce the effect of the weight force of the door, while having very small overall dimensions in the width direction of the piece of furniture, i.e. between the opposed sides of the piece of furniture that delimited an internal cavity with which the closing flap door is associated.

Referring to DE 202018104752 U1, the device for supporting and moving doors has considerable height and depth dimensions along the shoulders of the piece of furniture due to the need to accommodate the elastic means of the device.

Likewise, the device for supporting and moving the doors of US 2018/0058123 A1 has considerable dimensions along the sides of the piece of furniture, particularly in the depth direction of the compartment of the piece of furniture, still due to the need to accommodate the elastic means of the device.

SUMMARY OF THE INVENTION

The invention is based on the problem of providing a device for supporting and moving furniture doors, namely a device for supporting and moving upward opening flap doors, which has such structural and functional characteristics as to fulfill the aforementioned requirement and to have a small layout in the width direction of the piece of furniture, while obviating the aforementioned prior art drawbacks.

This problem is solved by a device as defined in the independent claim(s) for supporting and moving furniture doors.

BRIEF DESCRIPTION OF THE FIGURES

Further features and advantages of the device of the present invention for supporting and moving furniture doors result from the following description of one preferred embodiment thereof, which is given by way of illustration and without limitation with reference to the accompanying figures, in which.

DETAILED DESCRIPTION OF INVENTION

Figure 1:
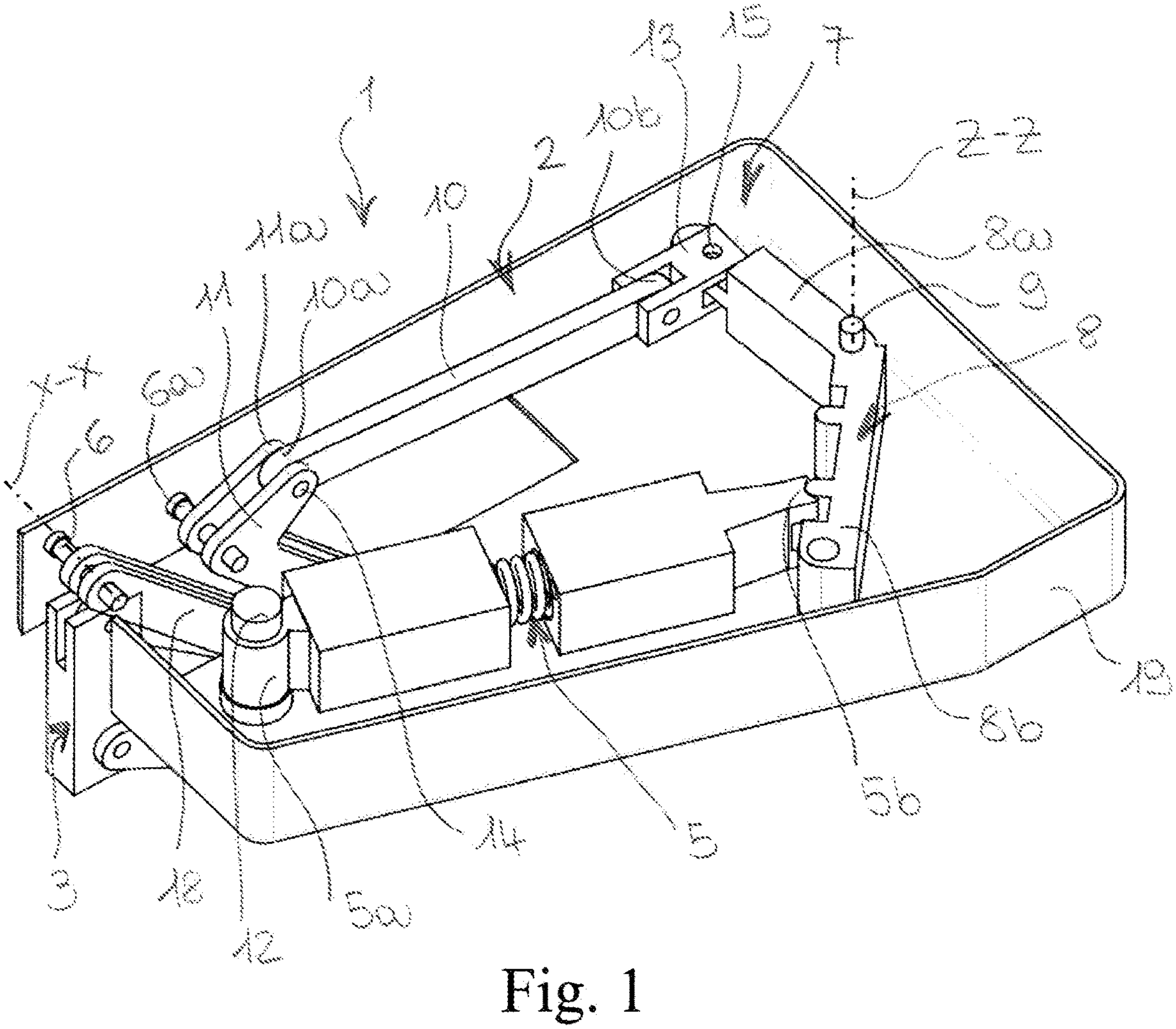
FIG. 1 shows a top perspective view of the device of the invention in a retracted configuration.
Figure 2:
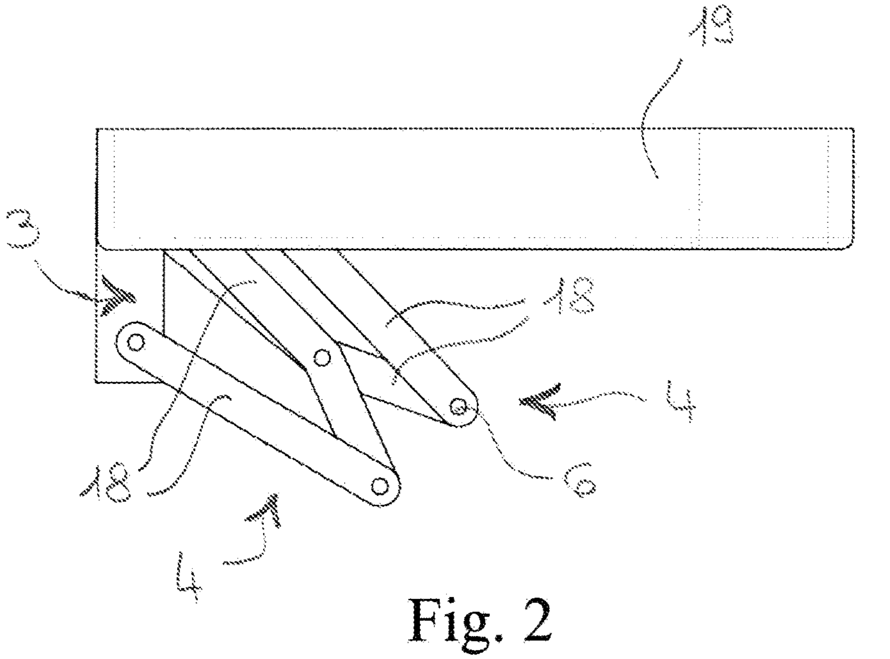
FIG. 2 is a side plan view of the device of FIG. 1.

Referring to the accompanying drawings, a device 1 for supporting and moving doors of a piece of furniture 30 is generally designated by numeral 1.

According to the illustrated embodiments, the piece of furniture 30 is a wall unit which is intended to be secured to a masonry structure.

The aforementioned piece of furniture 30 comprises a body formed by vertical walls 31 and horizontal walls 32 joined together to define an internal compartment closed by a movable door 33 jointedly supported by said body to move from a position that closes said internal compartment to an open position.

The piece of furniture 30 comprises a rear wall 34 intended in use to face or contact a masonry structure that supports said body.

Advantageously, the movable door 33 is jointedly supported by the body of the piece of furniture with the interposition of an inventive device 1 for supporting and moving doors.

Figure 10:
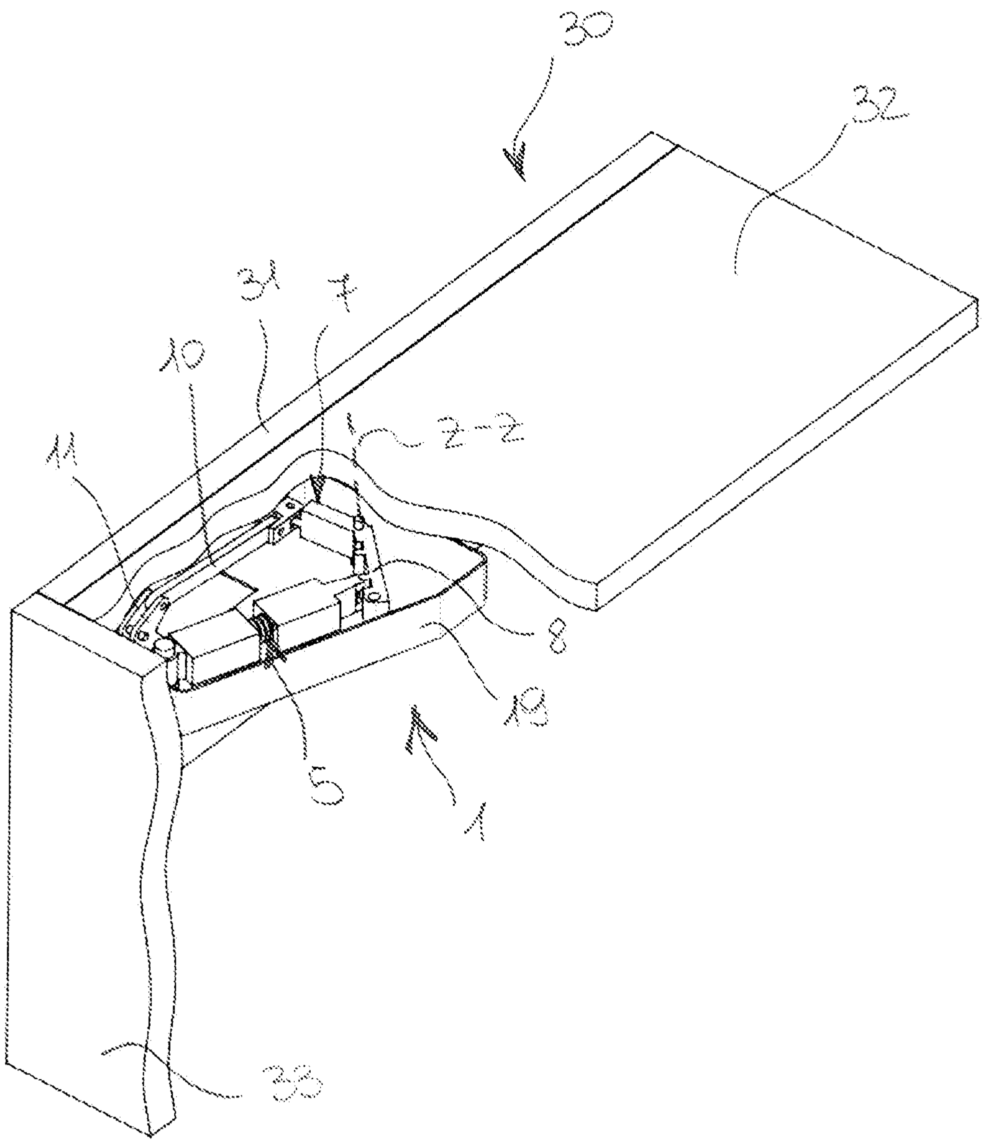
FIGS. 10, 11 and 12 show the device of FIG. 1 applied in the body of a piece of furniture with the flap door in the retracted, partially extended and fully extended configurations, respectively.
Figure 11:
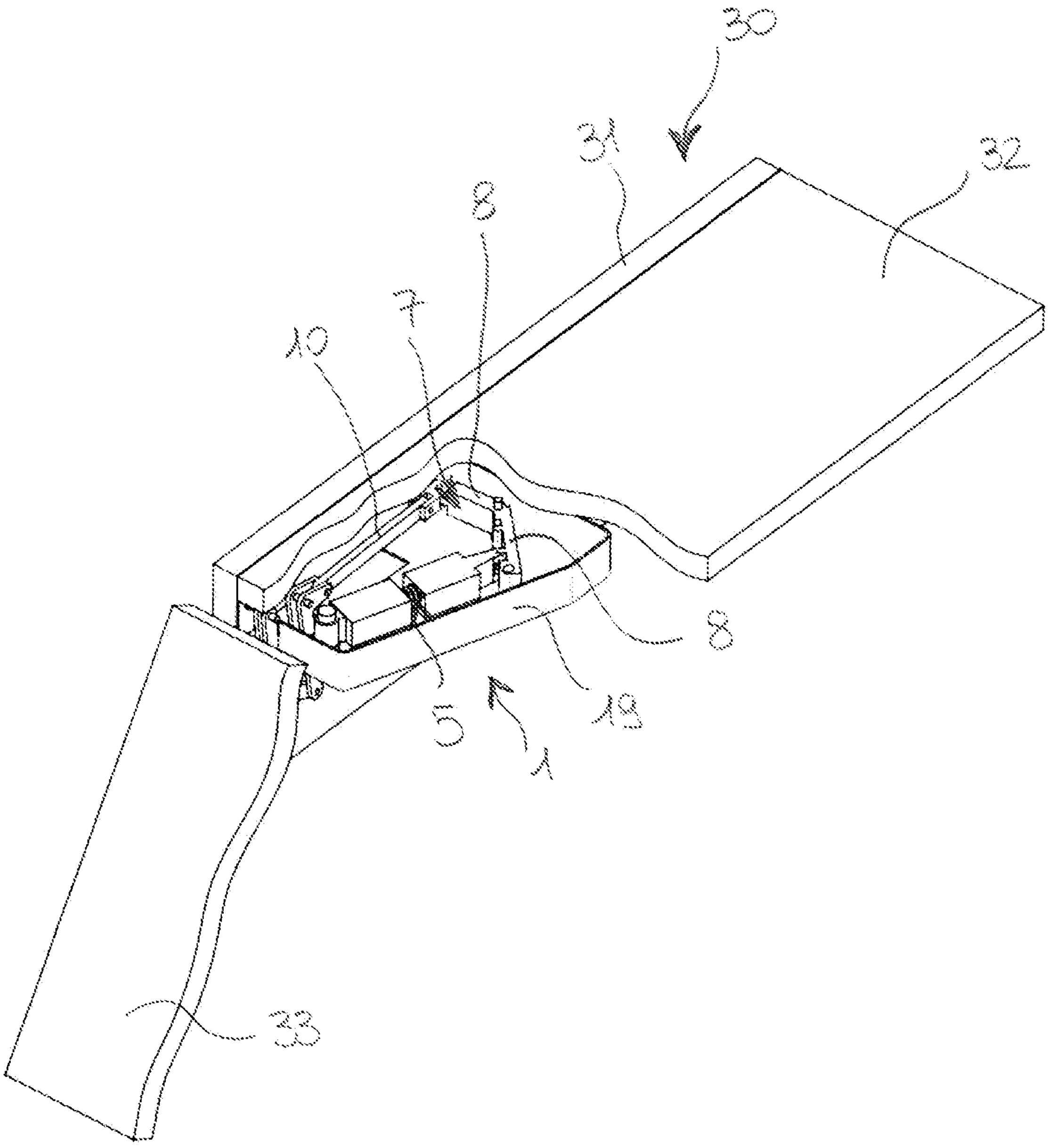
Figure 12:
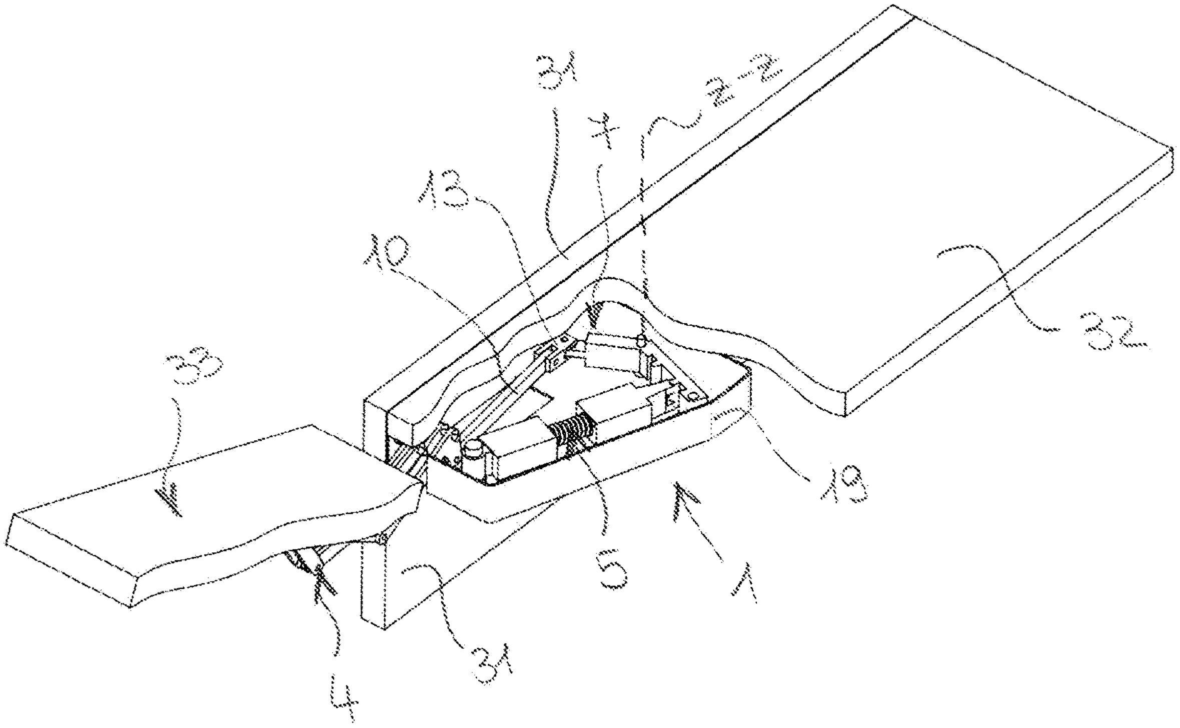
Figure 13:
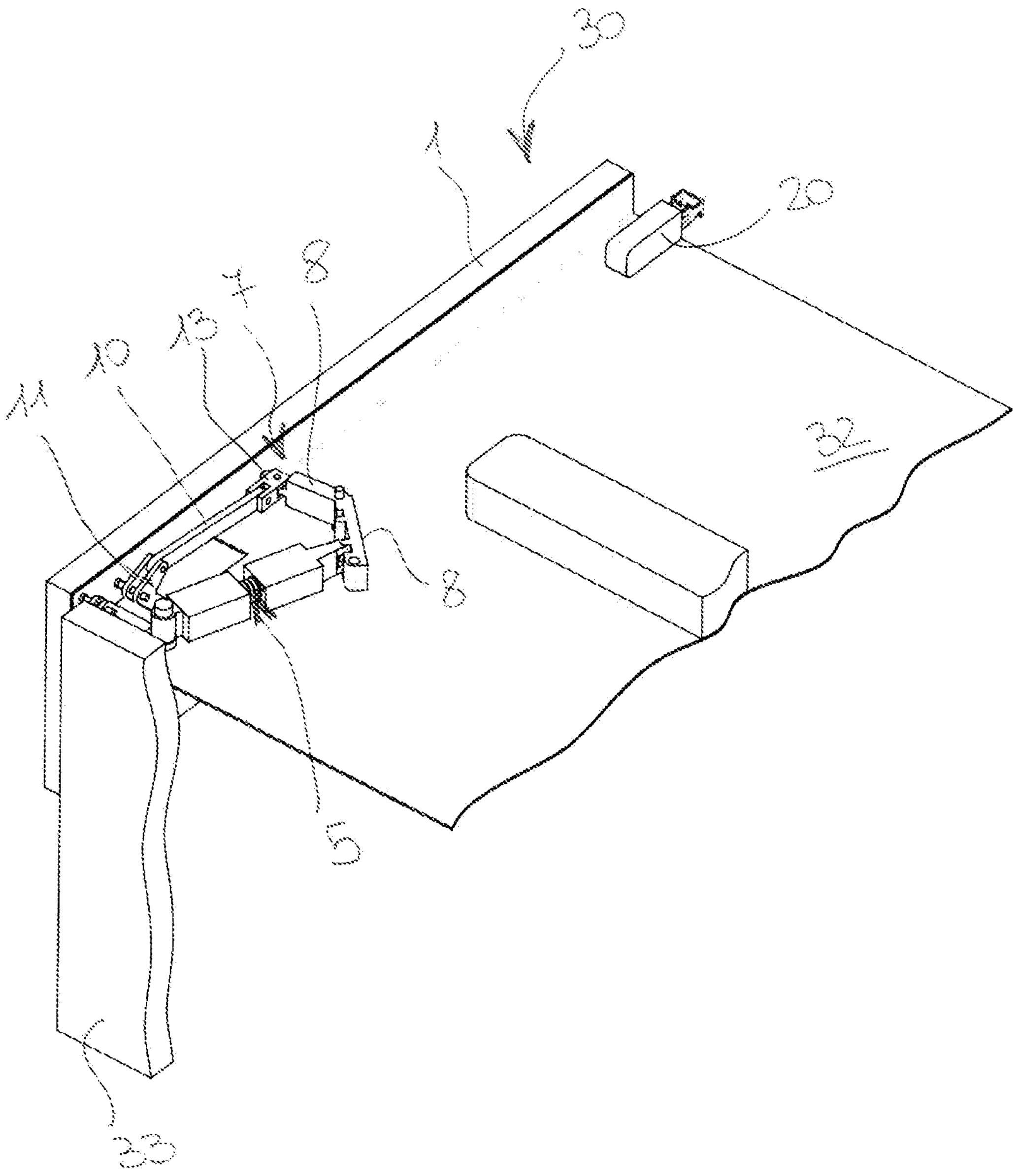
FIGS. 13, 14 and 15 show the device of FIG. 1 applied to the body of a piece of furniture with the flap door in the retracted, partially extended and fully extended configurations, respectively.
Figure 14:
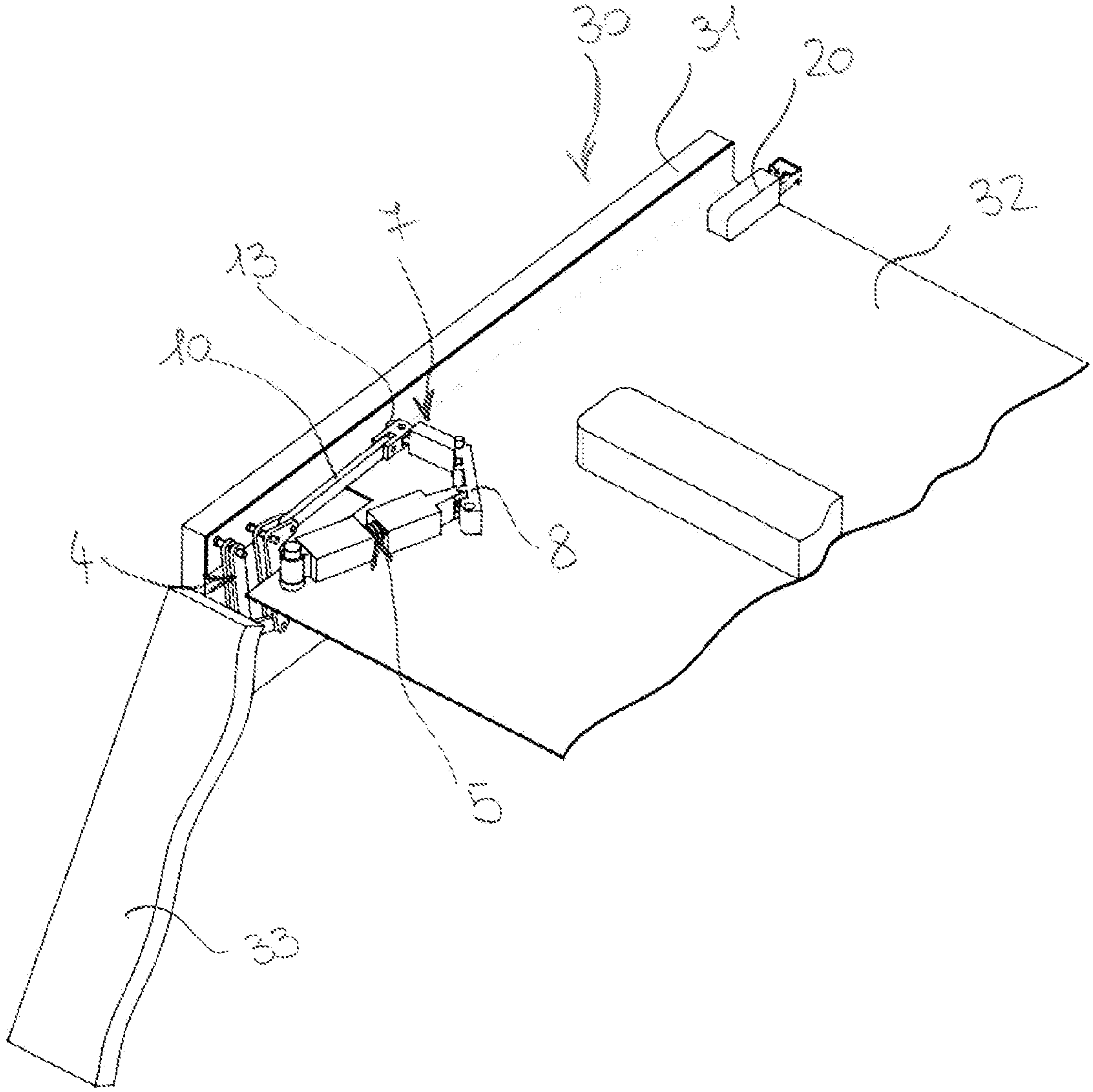
Figure 15:
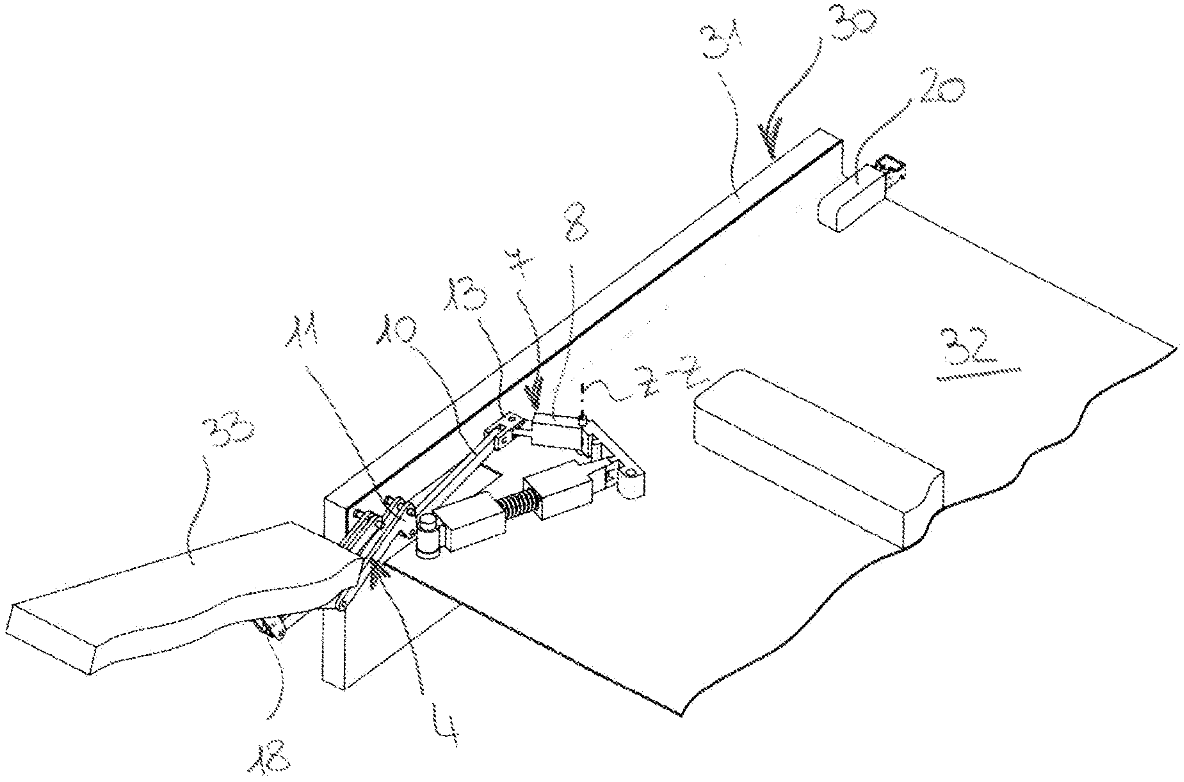
Figure 16:
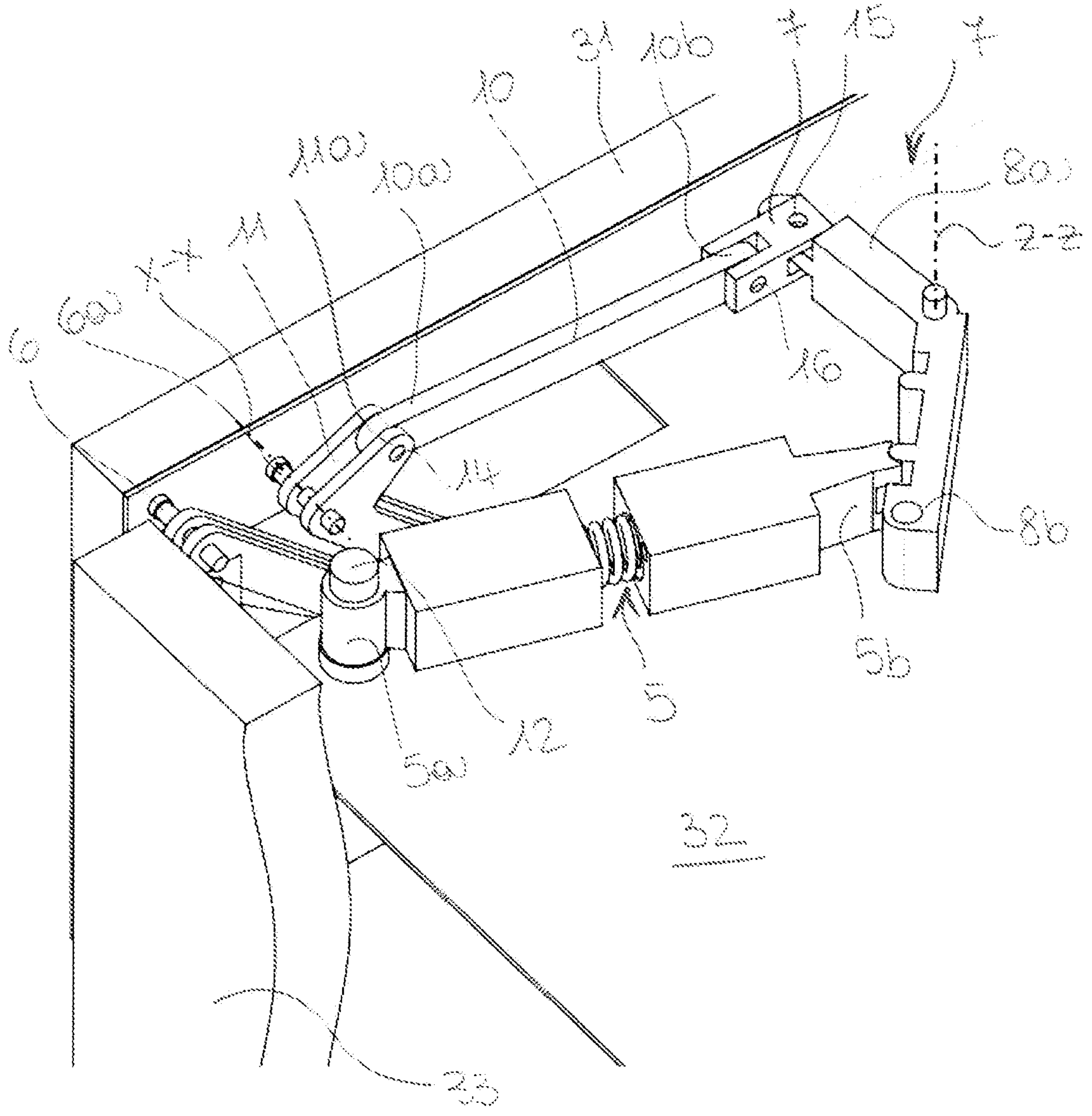
FIGS. 16, 17 and 18 are enlarged views of a few details of the device of the invention as shown in FIGS. 13, 14 and 15.
Figure 17:
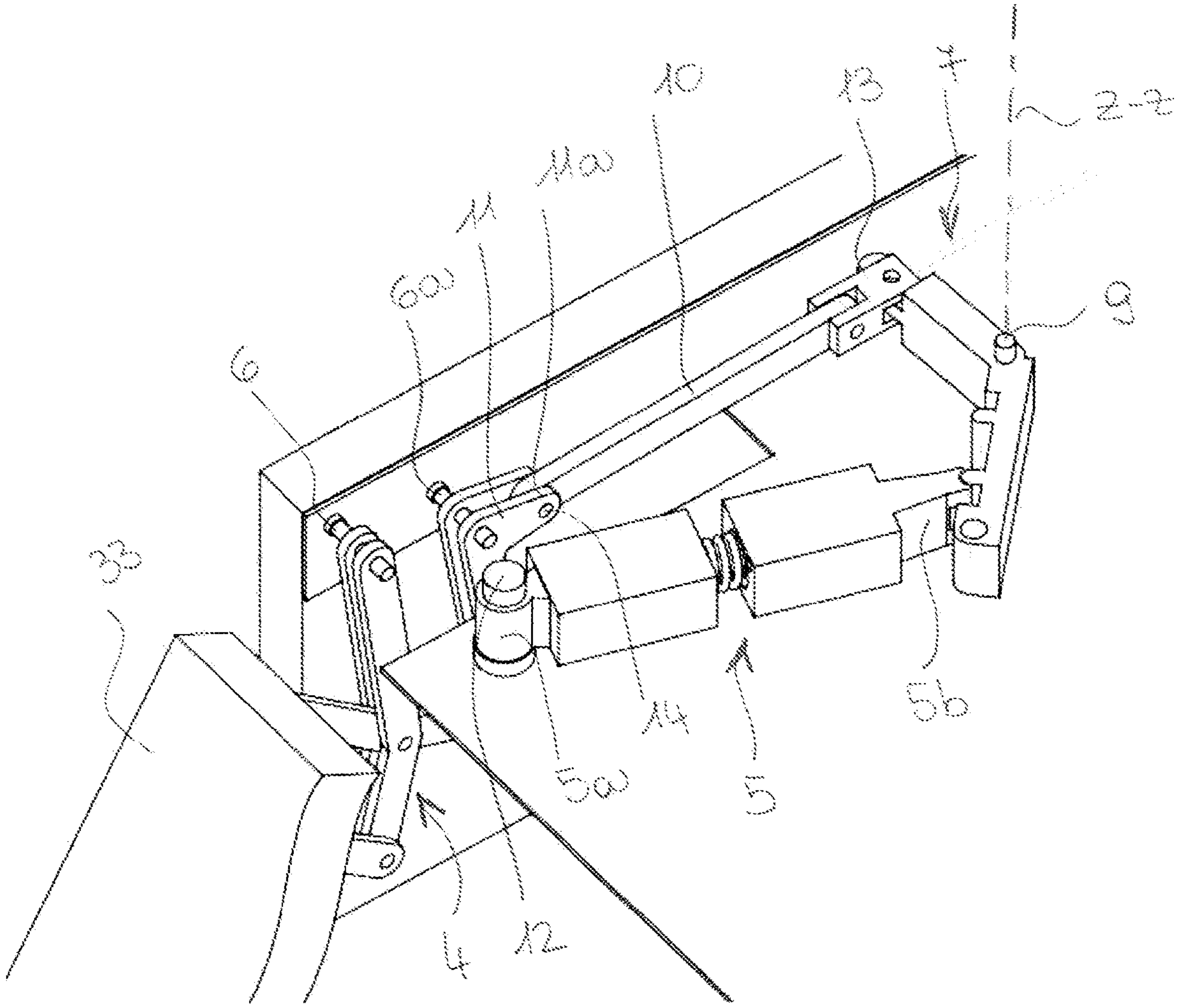
Figure 18:
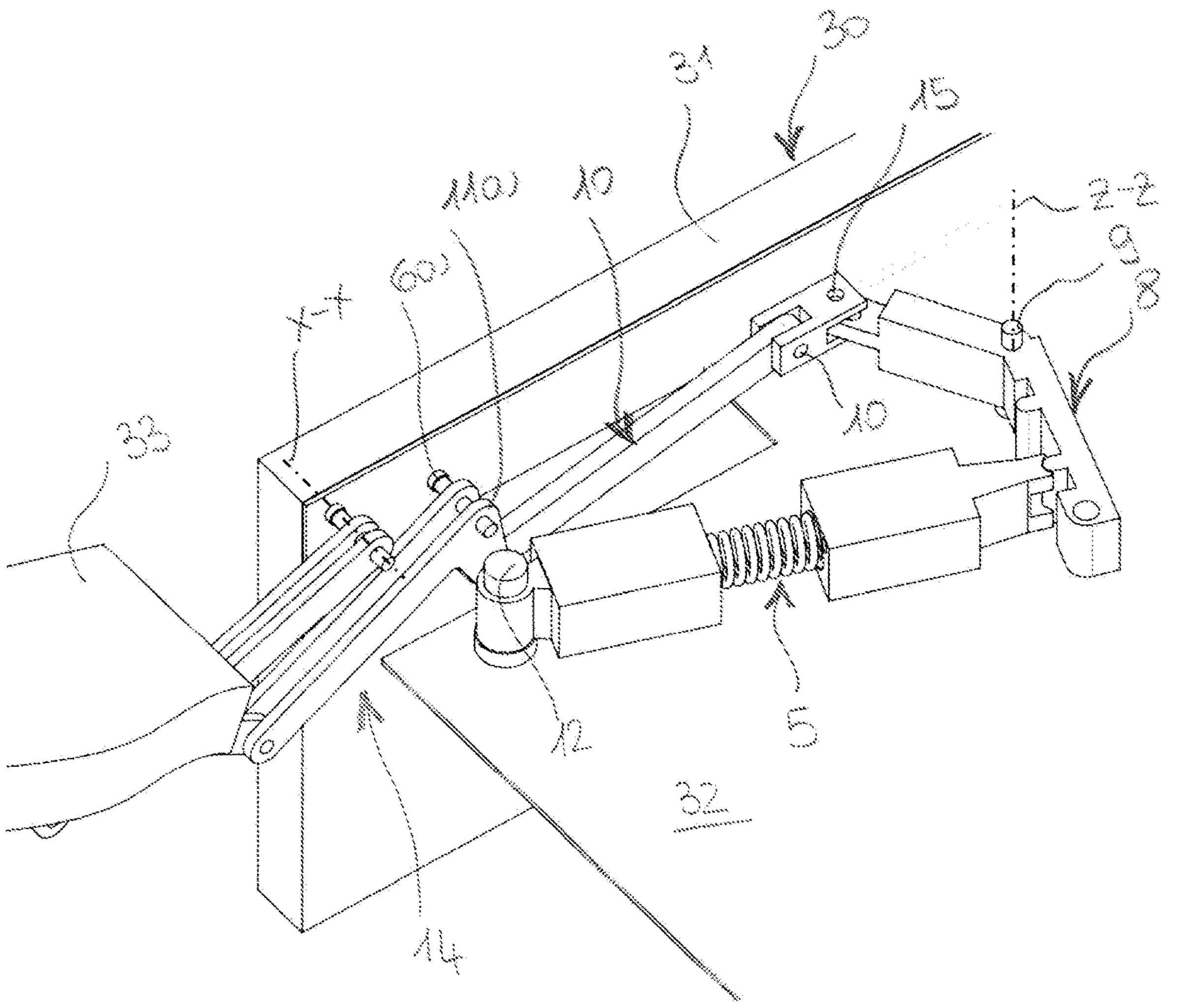
Figure 19:
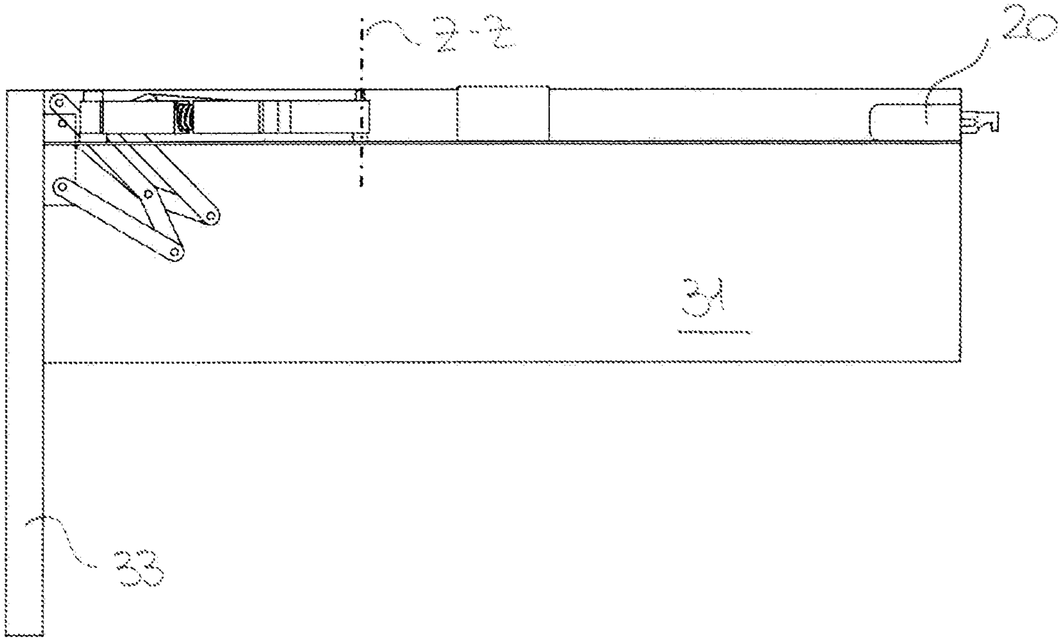
FIGS. 19 and 20 are flat views, i.e. side and plan views respectively, of the piece of furniture and the inventive device as shown in FIG. 13.
Figure 20:
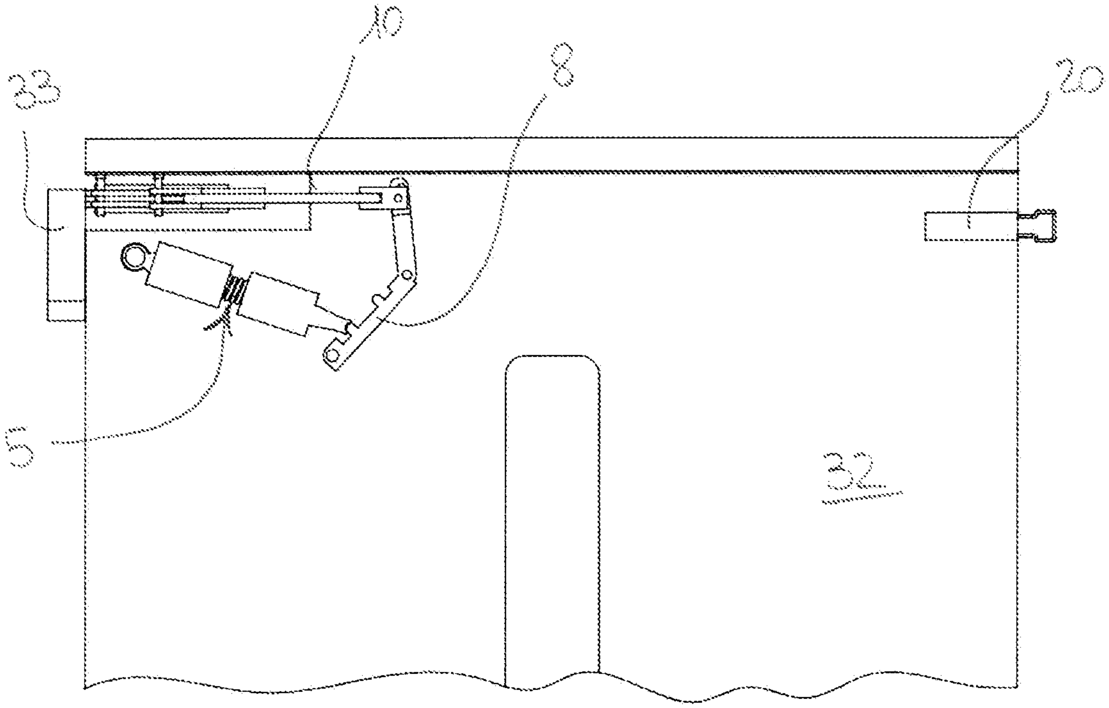
Figure 21:
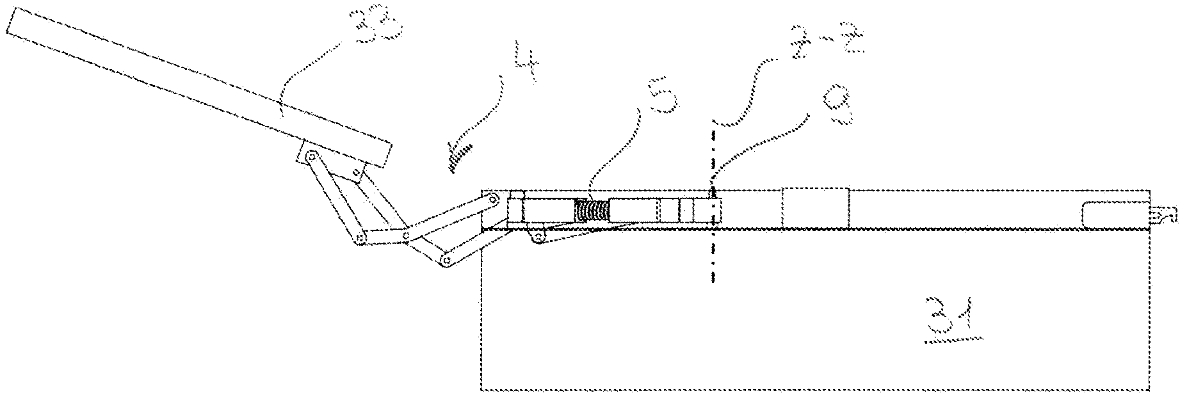
FIGS. 21 and 22 are flat views, i.e. side and plan views respectively, of the piece of furniture and the inventive device as shown in FIG. 18.
Figure 22:
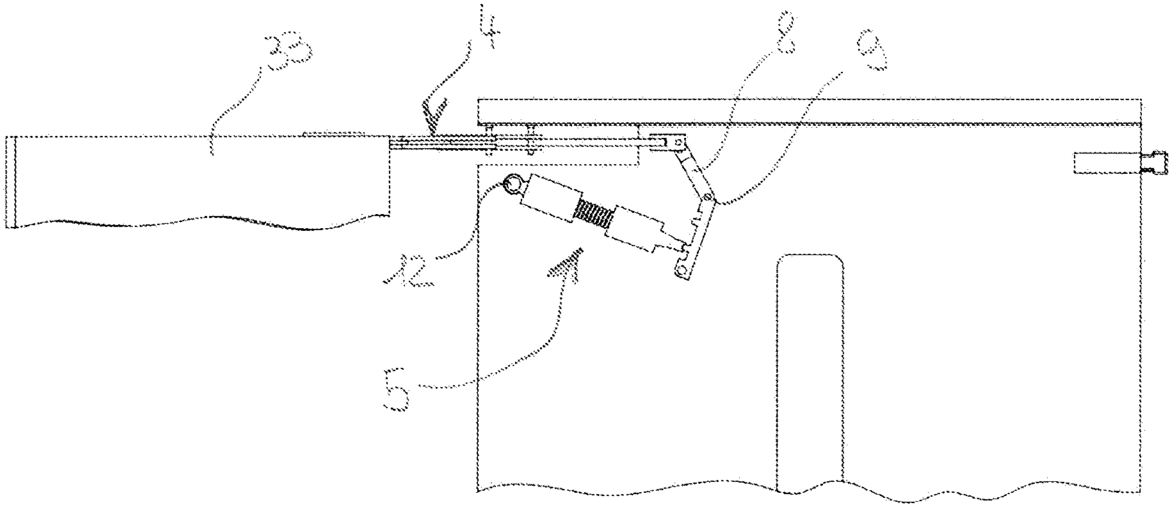
Figure 23:
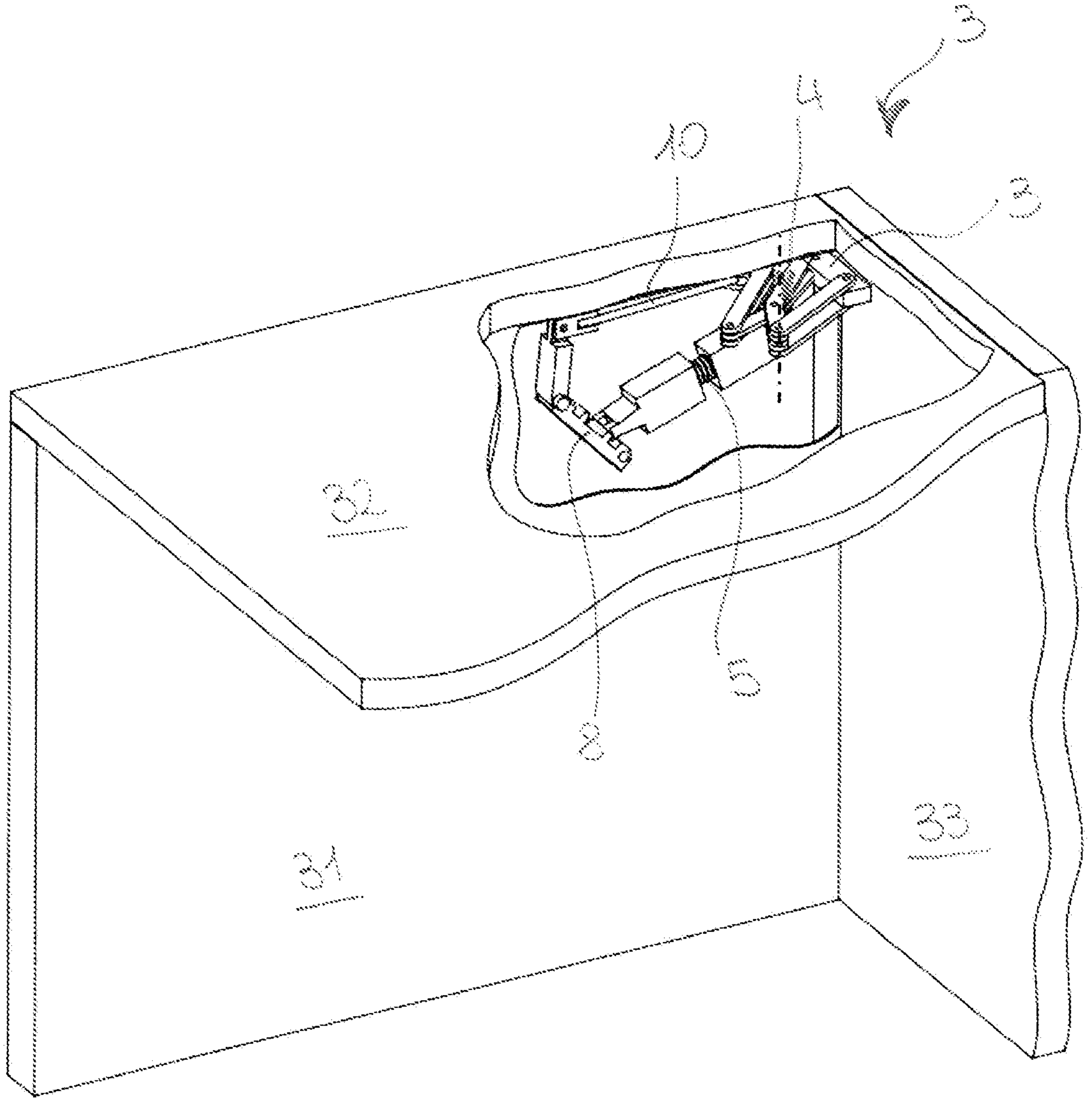
FIGS. 23, 24 and 25 show the device of FIG. 1 applied in the body of a piece of furniture with a lateral opening flap door in the retracted, partially extended and fully extended configurations.
Figure 24:
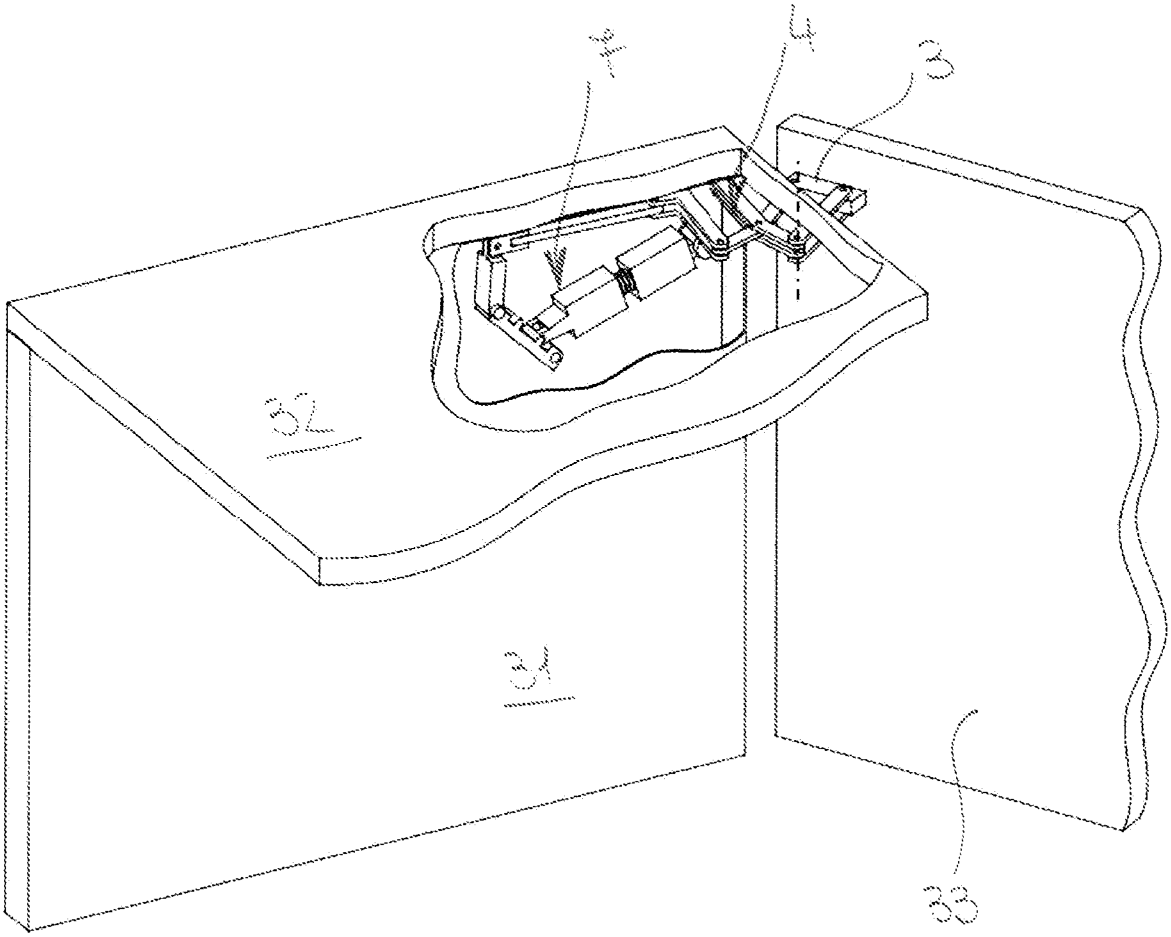
Figure 25:
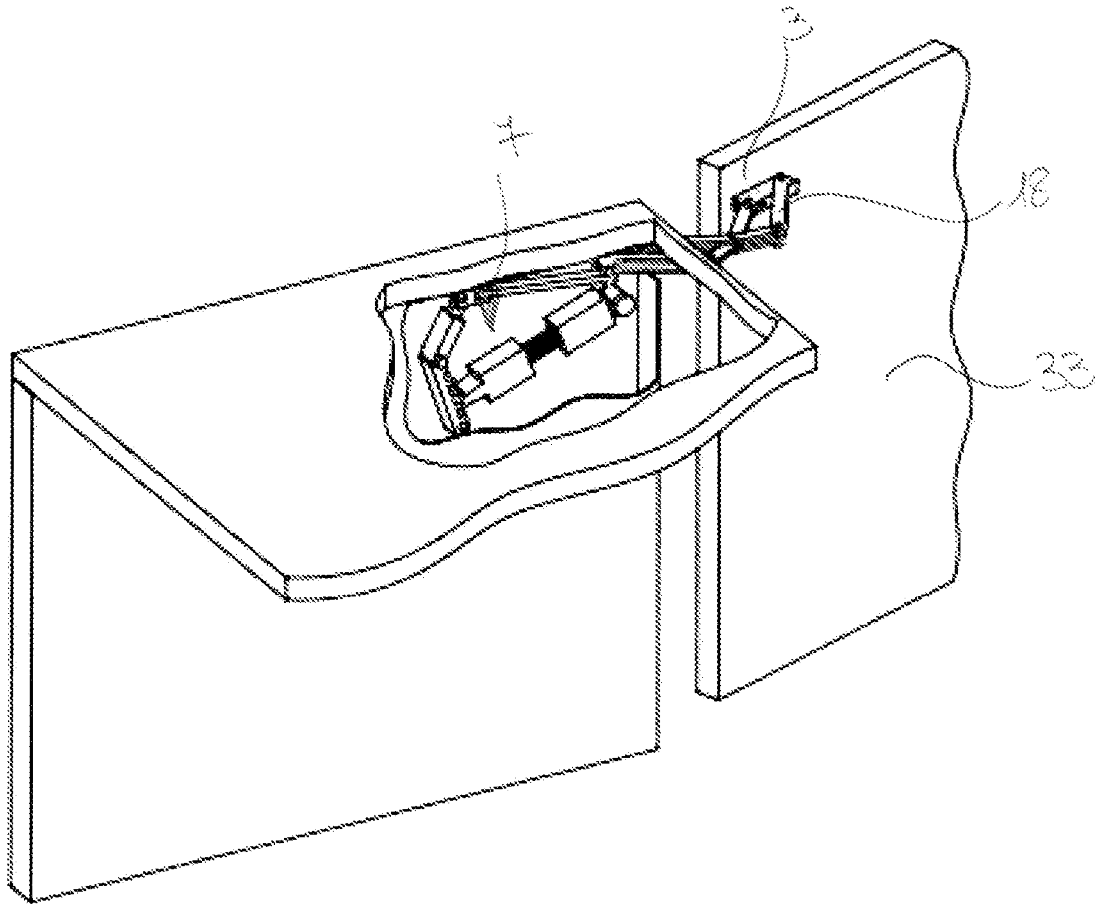
Figure 26:
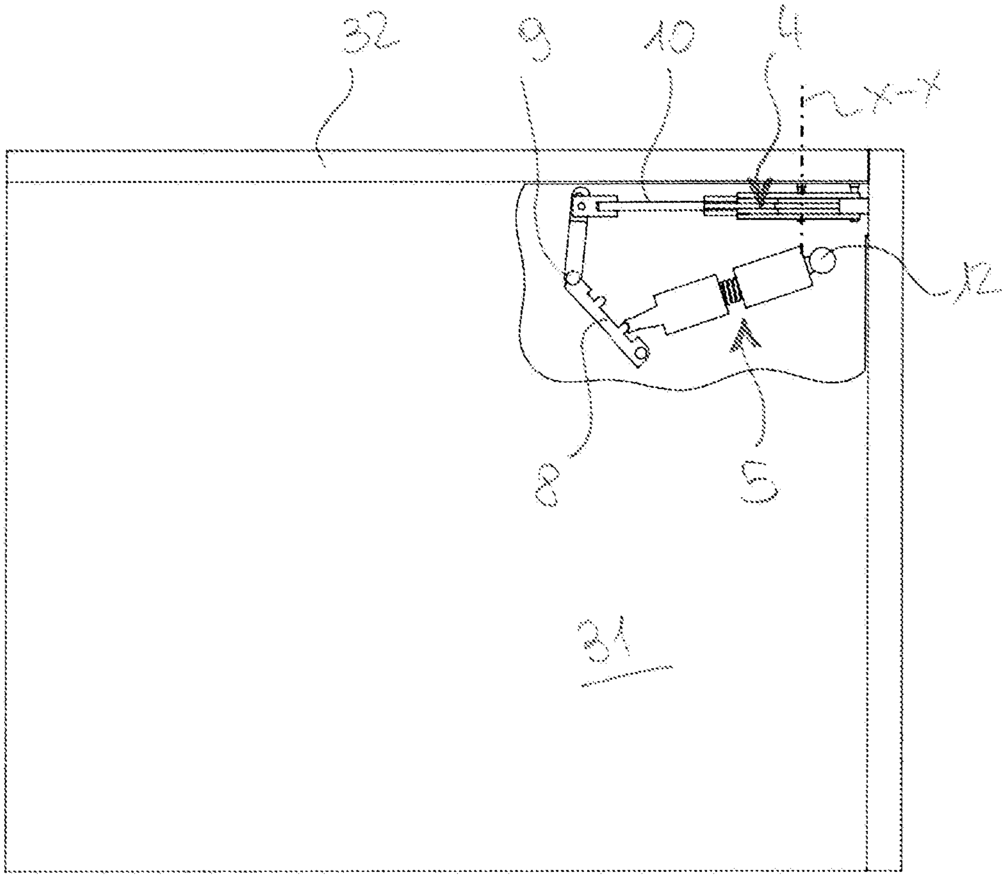
FIGS. 26, 27 and 28 are flat side views of the device of FIGS. 23, 24 and 25 respectively.
Figure 27:
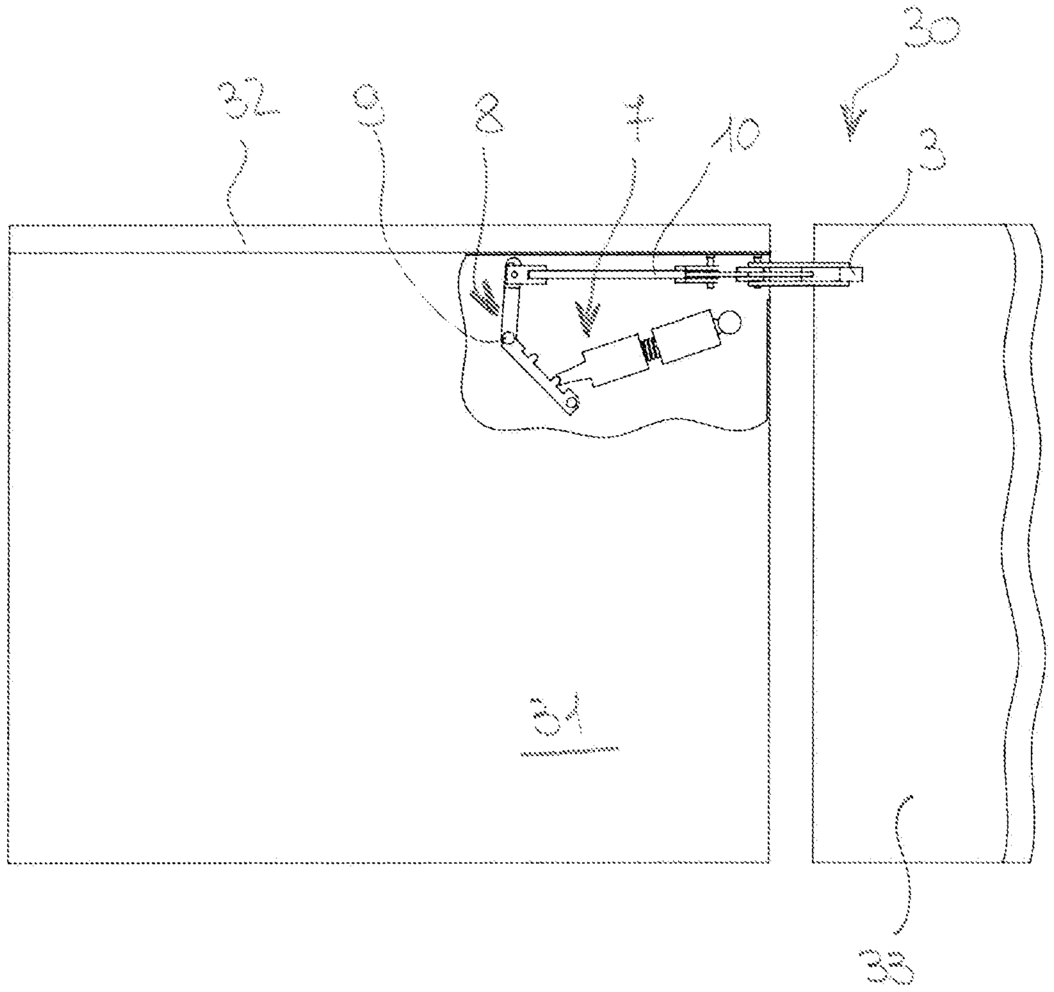
Figure 28:
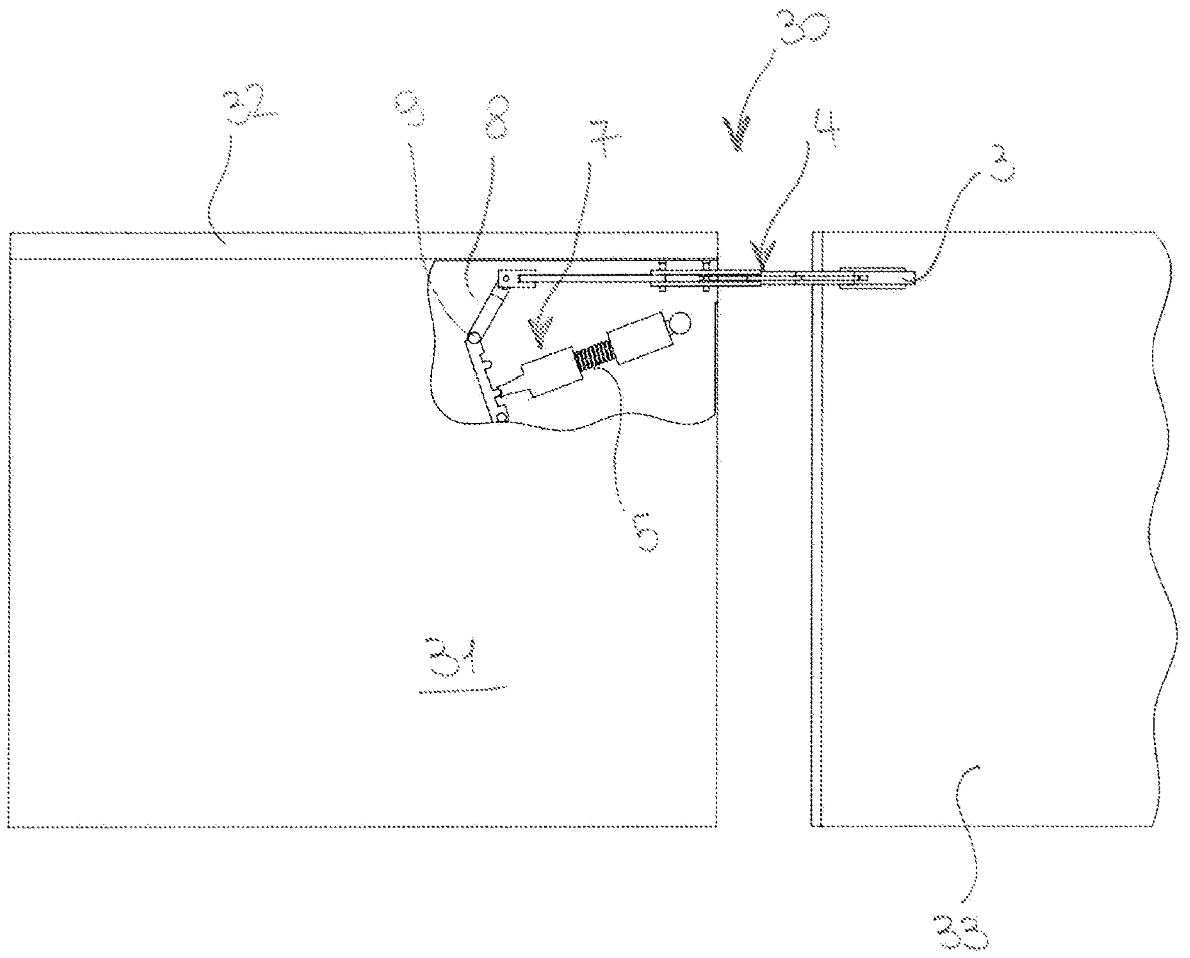

With reference to the different illustrated embodiments, it shall be noted that:

- FIGS. 1 to 8 only show the device 1 of the invention or parts thereof;
- FIGS. 10 to 12 show a piece of furniture 30 with an upward opening movable flap door 33 having the device 1 of the invention entirely accommodated in the internal compartment;
- FIGS. 13 to 22 show a piece of furniture 30 with an upward opening movable flap door 33 having the device 1 of the invention partially accommodated in the internal compartment and
- FIGS. 23 to 28 show a piece of furniture 30 with a lateral opening movable flap door 33 having the device 1 of the invention accommodated in the internal compartment.

The parts of the pieces of furniture 30 and the device 1 as shown in the different illustrated embodiments that are structurally and/or functionally identical will be designated by the same reference numerals and will not be described in further detail each time.

Concerning the device 1 of the invention, it should be noted that, as further shown hereinafter, this device may be used to ensure upward and downward tilt-opening of furniture doors, and to ensure support and handing of doors having a lateral opening with respect to the compartment of the piece of furniture.

The device 1 of the invention comprises:

- a first fixed part 2 intended to be secured to a body of a piece of furniture 30;
- a second part 3 intended to be secured to a door 33 of the piece of furniture 30;
- articulated connection means 4 for jointedly connecting said first fixed part 2 to said second movable part 3.

Figure 3:
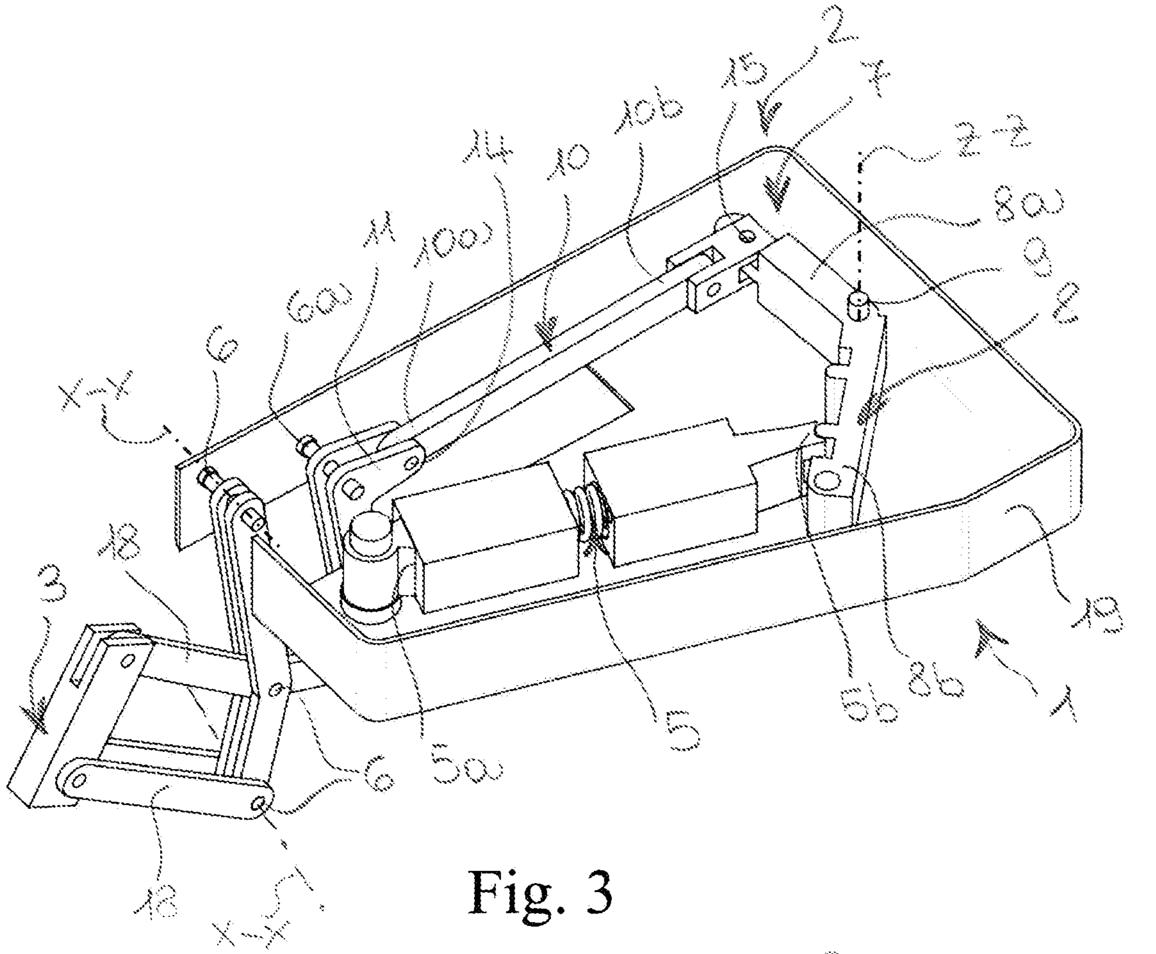
FIG. 3 is a view of the device of FIG. 1 in a partially extended configuration.
Figure 4:
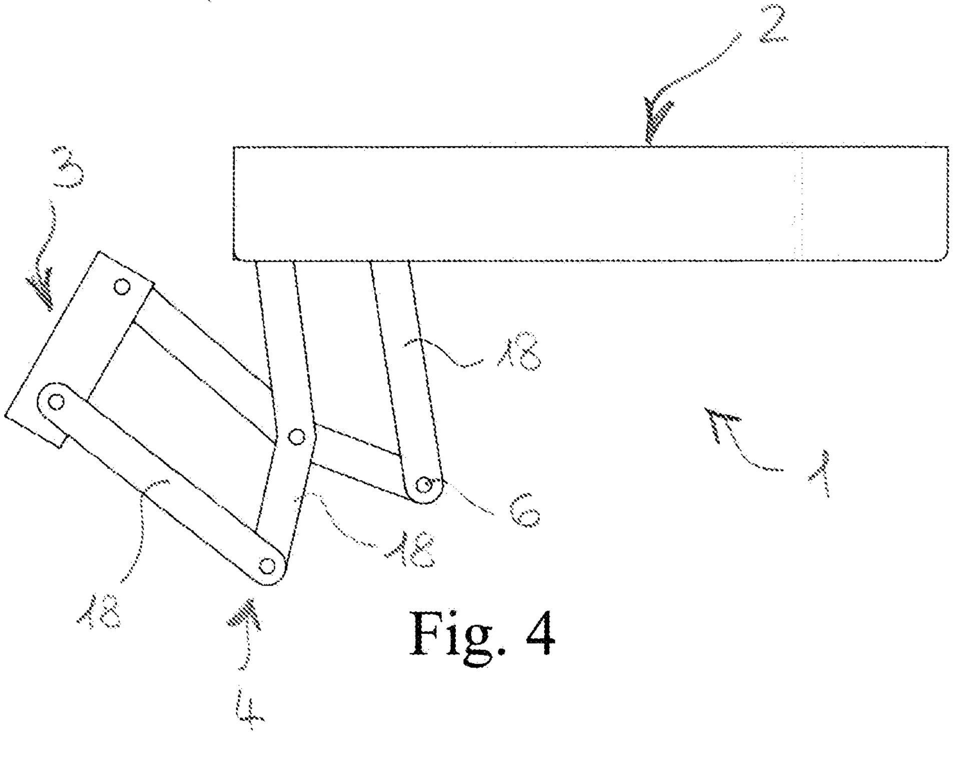
FIG. 4 is a side plan view of the device of FIG. 3.
Figure 5:
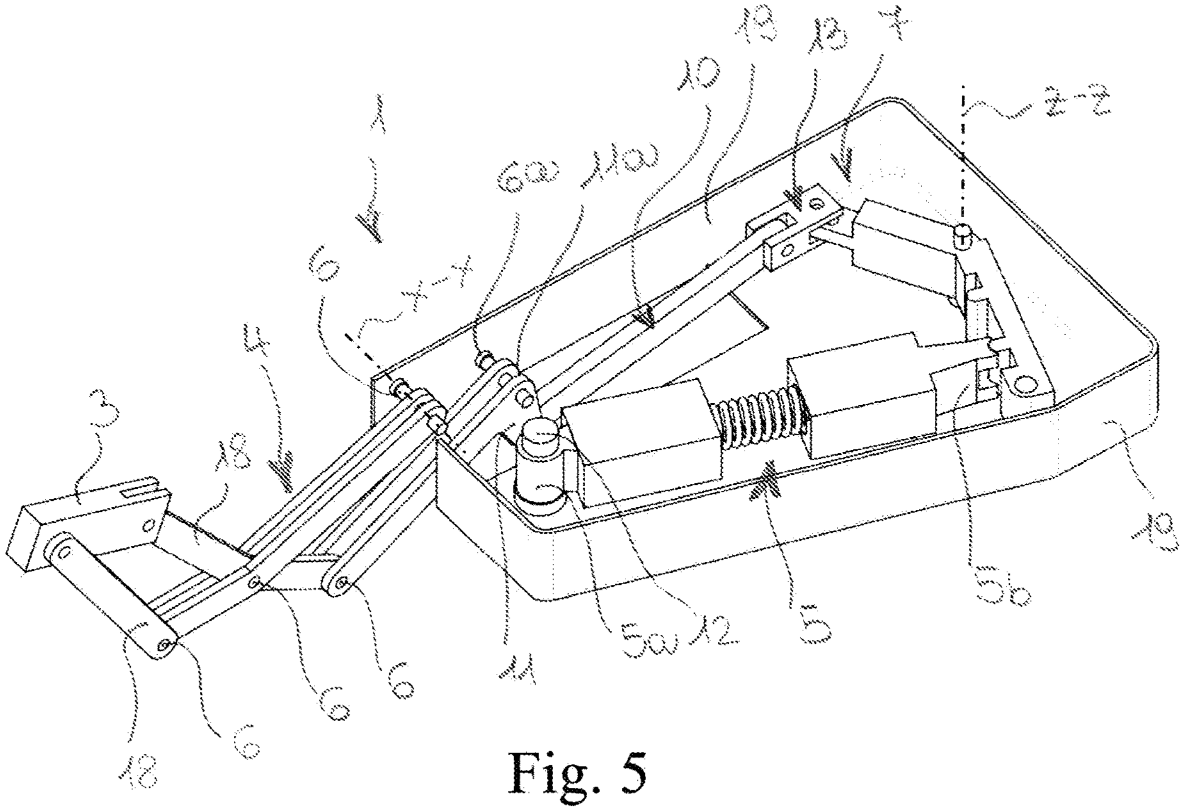
FIG. 5 is a view of the device of FIG. 1 in a fully extended configuration.
Figure 6:
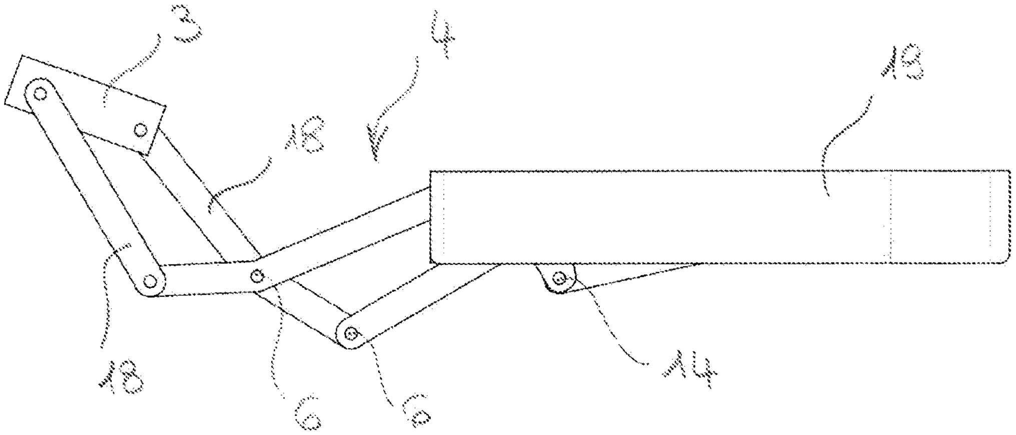
FIG. 6 is a side plan view of the device of FIG. 5.
Figure 7:
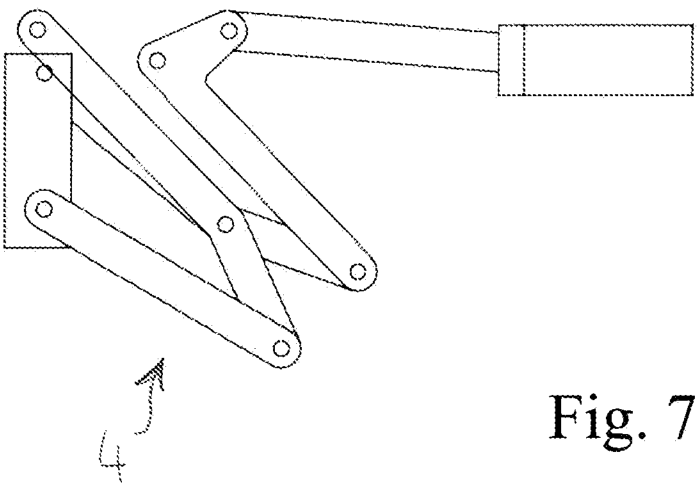
FIGS. 7, 8 and 9 are side plan views of the articulated connection means 4 of the device of the invention in the retracted, partially extended and fully extended configurations, respectively.
Figure 8:
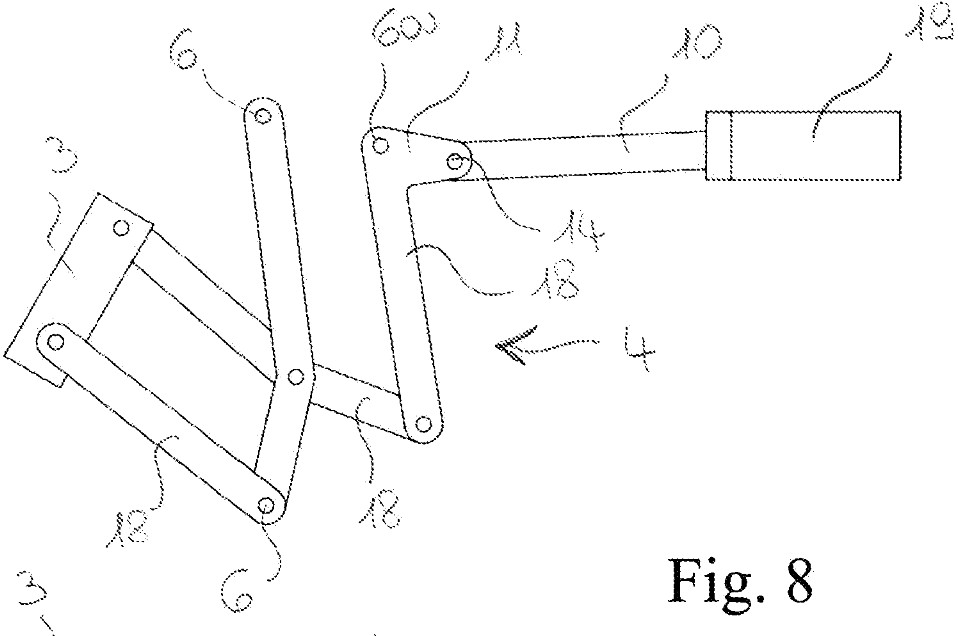
Figure 9:
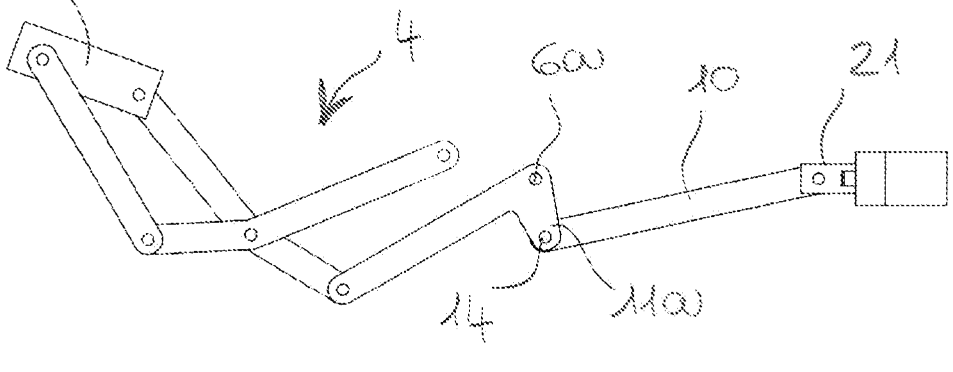

In view of the above, said first fixed part 2 and said second movable part 3 are jointedly connected to each other in order to let said device 1 pass reversibly from:

- a retracted configuration (see FIGS. 1, 2, 7; 10; 13, 16, 19, 20; 23), in which the door is supported in a closed position of the internal compartment of the piece of furniture and
- an extended configuration (see FIGS. 5, 6, 9; 12; 18, 21, 22; 25) in which said second movable part 3 is more spaced from said first fixed part 2 and the door 33 of the piece of furniture 30 is supported in an open condition of the internal compartment of the piece of furniture 30, through an intermediate opening state (see FIGS. 3, 4, 8; 11; 14, 17; 24).

The aforementioned articulated connection means 4 comprise a plurality of articulation pins 6 extending parallel to each other in a first direction X-X, so that said articulated connection means 4 will be movable in a moving plane perpendicular to said first direction X-X.

The device 1 also comprises elastic means 5 kinematically connected via kinematic connection means 7 to a push lever 11 of said articulated connection means 4 to push said push lever 11 with a predetermined elastic load and move said device 1 toward said extended configuration, in which said second movable part 3 is more spaced from said first fixed part 2, only once said second movable part 3 of said device 1 has run a first length of the displacement from said retracted configuration toward said extended configuration, said articulated connection means 4 are pivoted to rotate about a pin 6*a*.

According to an advantageous aspect, the elastic means 5 and the aforementioned kinematic connection means 7 are coplanar and substantially lie in a plane perpendicular to the moving plane of the articulated connection means 4.

According to the illustrated embodiment, the aforementioned kinematic connection means 7 comprise:

- a rocker lever 8 pivoted to rotate about a lever fulcrum 9 and having a first lever arm 8*a* and a second lever arm 8*b* positioned on opposite sides with respect to said lever fulcrum 9 and
- a connecting rod 10 for kinematic ally connecting said first lever arm 8*a* of said rocker lever 8 to one end 11*a* of said push lever 11 of said articulated connection means 4,
- wherein said elastic means 5 are interposed and push between said second lever arm 8*b* of said rocker lever 8 and a fixed stop element 12 with respect to said first fixed part 2.

Preferably, said lever fulcrum 9 of the rocker lever 8 extends axially in a second direction Z-Z perpendicular to the first direction X-X, to allow a rotation of the rocker lever 8 about an axis of rotation extending in said second direction Z-Z and passing through the lever fulcrum 9.

Preferably, the aforementioned stop element 12 defines a pivot pin extending in the direction Z-Z for a first end 5*a* of the elastic means 5, to allow said first end 5*a* of the elastic means 5 to rotate about a rotation axis parallel to the rotation axis Z-Z of the rocker lever 8.

Preferably, the aforementioned elastic means 5 comprise a helical spring that acts between two rigid end tips 5*a* and 5*b*, with:

- the first end tip 5*a* pivoted about the aforementioned stop element 12 and
- the second end tip 5*b* positioned to act against the second lever arm 8*b* of the rocker lever 8.

Preferably, the aforementioned first connecting rod 10 comprises:

- a first end 10*a* pivoted to said second end 11*a* of the push lever 11 by means of a connecting pin 14 extending parallel to said first direction X-X and
- a second end 10*b* constrained to said first lever arm 8*a* of said rocker lever 8 by means of a bilateral constraint suitable to keep the second end 10*b* of the first connecting rod 10 and the first lever arm 8*a* engaged with each other.

According to the illustrated embodiment, the aforementioned second end 10*b* of the first connecting rod 10 is constrained to the first lever arm 8*a* of the rocker lever 8 by interposition of an articulated joint 13 adapted to allow reciprocal rotations between the second end 10*b* of the first connecting rod 10 and the first lever arm 8*a* of rocker lever 8 about:

a first axis of rotation parallel to the axis of rotation Z-Z of the rocker lever 8 and a second axis of rotation parallel to the aforementioned first direction X-X.

Preferably, the aforementioned articulated joint 13 is connected to the first lever arm 8*a* of said rocker lever 8 by means of a pin 15 extending parallel to the axis of rotation Z-Z of the rocker lever 8 and is connected to said first connecting rod 10 by means of a pin 16 extending parallel to said first direction X-X.

Preferably, the aforementioned elastic means 5, said rocker lever 8 and said connecting rod 10 are substantially coplanar.

In this regard it should be noted that as the device 1 moves from the retracted configuration (see FIGS. 1, 2, 7; 10; 13, 16, 19, 20; 23) to the extended configuration (see FIGS. 5, 6, 9; 12; 18, 21, 22; 25), and vice versa, the connecting rod 10 moves not only in the aforementioned plane defined by the rocker lever 8 and by the elastic means 5, but also in the aforementioned moving plane perpendicular to said first direction (X-X). This results from the fact that the end 10*a* of the connecting rod 10 is pivoted to the end 11*a* of the push lever 11 of the articulated connection means, said lever 11 being pivoted at 6*a*.

According to a preferred embodiment, the first fixed part 2, the second part 3 and the articulated connection means 4 define together an articulated hinge.

Preferably:

the articulated connection means 4 comprise seven articulation pins 6, 6*a* and/or the articulated connection means 4 comprise four articulated connecting rods 18.

Preferably, the device 1 is at least partially accommodated in a box-like body 19, in particular for the possibility of safe shielding of the elastic means 5 and the aforementioned kinematic connection means 7, for example the rocker lever 8, the articulated joint 13 and the first connecting rod 10.

Preferably, the device 1 may comprise hooking and adjusting means 20 for ensuring the securing of a wall unit to a wall structure. According to a preferred embodiment, such hooking and adjusting means 20 are integrated in the device 1, for example in the box-like body 19 from which they project beyond the rear wall 24 of the piece of furniture 30.

Referring to the device 1, the push action exerted by the elastic means 5 on the arm 8*b* of the rocker lever 8 is found to induce a rotating torque on said rocker lever 8 around its fulcrum 9 to push the first connecting rod 10 toward the articulated connection means 4 with a predetermined elastic load.

In this regard, it will be noted, as shown in the figures, that:

when the device 1 is in the aforementioned retracted position (see FIGS. 1, 2, 7; 10; 13, 16, 19, 20; 23) the bias action exerted by the first connecting rod 10 on the push lever 11 of the articulated connection means 4 is adapted to push and keep the device to and in the retracted position, and when the device 1 is in the aforementioned extended configuration position (see FIGS. 5, 6, 9; 12; 18, 21, 22; 25) the bias action of the first connecting rod 10 on the thrust lever 11 of the articulated connection means 4 is adapted to push and keep the device to and in the extended position.

Therefore, the bias action exerted by the connecting rod 10 on the articulated connection means 4 which elastically force the device into the retracted configuration when said device is in the retracted configuration and elastically force the device into the retracted configuration when said device is in the extended configuration, is justified in that, as the device 1 moves, the position of the end 11*a* of the push lever 11, acted upon by the connecting rod 1, changes its position by rotating with respect to the pivot pin 6*a* of the push lever 11. Therefore, in the aforementioned two different angular positions, corresponding to those of the device in the retracted or extended configurations, the action line of the force exerted on the end 11*a* of the push lever 11 of the connection means 4 is on each side the pivot pin 6*a* of the push lever 11, as easily shown by examination of FIGS. 7 and 9. FIG. 8 shows an intermediate opening position in which the action line of the force exerted on the end 11*a* of the push lever 11 of the connection means 4 substantially passes through the pivot pin 6*a* of the push lever 11, a position substantially corresponding to the bottom dead center of a crank and connecting rod system, in which the connecting rod is defined by the connecting rod and the crank is defined by the portion of the push lever 11 located between its end 11*a* and the pivot pin 6*a*.

According to the embodiment of FIGS. 10 to 12, the device 1 is applied to the piece of furniture 30 with the movable upward opening flap door 33. In this embodiment, the first fixed part 2 of the device 1 is applied to a shoulder of the piece of furniture, more specifically to the vertical wall 31 facing the internal compartment. Therefore, the aforementioned moving plane of the articulated connection means 4 is parallel to the first vertical wall 31, thereby allowing the tilting movement (here the upward tilting movement) of the door 33. Here, the kinematic connection means 7 of the device 1 are parallel to the horizontal walls 32 of the piece of furniture 3 and, specifically, are placed close to the upper horizontal wall 32 and thereunder, and hence inside the internal compartment of the piece of furniture 30.

The embodiment of FIGS. 10 to 22 substantially corresponds to that of FIGS. 10 to 12 as described above, excepting that in this embodiment the kinematic connection means 7 of the device 1 are still parallel to the horizontal walls 32 of the piece of furniture 3 but, in this case, are positioned above the upper horizontal wall 32 of the piece of furniture 30, thus being outside the body identified by the piece of furniture 30.

Otherwise, FIGS. 23 to 28 show a piece of furniture 30 with a lateral opening movable flap door 33 having the device 1 of the invention accommodated in the internal compartment, with:

the aforementioned moving plane of the articulated connection means 4 parallel to the horizontal walls 32 of the piece of furniture 30, in the illustrated example parallel to and close to the upper horizontal wall of the piece of furniture and the kinematic connection means 7 positioned parallel to and close to the inner side of a vertical wall 31 of the piece of furniture 30.

While the figures only show portions of pieces of furniture with a device 1 associated with each door, it should be noted that proper support and moving of the doors of a piece of furniture requires, for each door, the use of at least two separate devices 1 acting at distal portions of each door.

As clearly shown in the above description, the device of the present invention fulfills the above mentioned need and also obviates prior art drawbacks as set out in the introduction of this disclosure. That is, the structure of the device 1 provides kinematic connection means lying in a plane other than and orthogonal to the moving plane of said articulated connection means, thereby affording a dimensional reduction inside or around the piece of furniture. Furthermore, this solution affords the use of elastic means that can exert a very strong elastic force, which allows moving of large and heavy doors, even with reduced dimensions.

A further advantage of the device of the present invention is the possibility of advantageously using structurally simple components, which can mutually interact to perform the required movement without having excessively bulky dimensions and, at the same time, without the parts involved being excessively stressed, thereby ensuring proper long-lasting operation over time, also after many cycles.

Yet another advantage of the device of the present invention is in the possibility of making and assembling its components in automated production lines, the device being thus sold in a ready for use form, only requiring to be positioned and connected to the body of the piece of furniture and to the door.

Those skilled in the art will obviously appreciate that a number of changes and variants may be made to the above device, still within the scope of the invention, as defined in the following claims.

The invention claimed is:

1. A device for supporting and moving doors, comprising:

a first fixed part configured to be secured to a body of a piece of furniture;

a second part configured to be secured to a door of the piece of furniture;

articulated connection means for jointly connecting said first fixed part to said second movable part so said first fixed part and said second movable part being jointly connected to each other to let said device pass reversibly between:

a retracted configuration wherein said first fixed part and said second part are close to each other, in order to have the door configured to be supported in a closed condition of an internal compartment of the piece of furniture and an extended configuration wherein said second movable part is more spaced from said first fixed part to have the door configured to be supported in an open condition of the internal compartment of the piece of furniture, said articulated connection means comprise a plurality of articulation pins extending parallel to each other in a first direction, said articulated connection means being movable in a moving plane perpendicular to said first direction, elastic means kinematically connected via kinematic connection means to a push lever of said articulated connection means to push said push lever with a predetermined elastic load and move said device toward said extended configuration, in which said second movable part is more spaced from said first fixed part wherein:

said elastic means act via said kinematic connection means on the push lever of said articulated connection means in order to push said push lever with the predetermined elastic load and move said device toward said extended configuration only once said second movable part of said device has run a first length of the displacement from said retracted configuration toward said extended configuration of said device and said articulated connection means are pivoted to rotate around a pin, wherein:

said elastic means and said kinematic connection means are coplanar and lie in a plane perpendicular to said moving plane of said articulated connection means.

2. The device according to claim 1, wherein said kinematic connection means comprise:

a rocker lever pivoted to rotate around a lever fulcrum and having a first lever arm and a second lever arm positioned on opposite sides with respect to said lever fulcrum and a connecting rod for kinematically connecting said first lever arm of said rocker lever to one end of said push lever of said articulated connection means, and wherein said elastic means are interposed and act in pushing between said second lever arm of said rocker lever and a fixed stop element with respect to said first fixed part.

3. The device according to claim 2, wherein said lever fulcrum of said rocker lever extends axially in a second direction perpendicular to said first direction to allow rotation of said rocker lever around an axis of rotation extended in said second direction and passing through said lever fulcrum.

4. The device according to claim 3, wherein a first end of said elastic means is pivoted to said stop element to rotate around an axis of rotation parallel to the axis of rotation of said rocker lever.

5. The device according to claim 3, wherein said connecting rod comprises:

a first end pivoted to said end of said push lever by means of a connecting pin extending parallel to said first direction and a second end constrained to said first lever arm of said rocker lever by means of a bilateral constraint suitable to keep engaged said second end of said connecting rod and said first lever arm.

6. The device according to claim 5, wherein said second end of said connecting rod is constrained to said first lever arm of said rocker lever by interposition of an articulated joint adapted to allow reciprocal rotations between said second end of said connecting rod and said first lever arm of said rocker lever around:

a first axis of rotation parallel to the axis of rotation of said rocker lever and a second axis of rotation parallel to said first direction.

7. The device according to claim 2, wherein said elastic means, said rocker lever and said connecting rod are substantially coplanar.

8. The device according to claim 1, wherein said first fixed part, said second part and said articulated connection means identify an articulated hinge.

9. The device according to claim 1, wherein said device is at least partially housed in a box-shaped containment body.

10. The device according to claim 1, comprising hooking and adjusting means for ensuring the securing of a wall unit to a wall structure.

11. A piece of furniture comprising a body formed by vertical walls and horizontal walls joined together to identify an internal compartment closed by a movable door supported by said body, wherein said movable door is connected to said body by means of a device for supporting and moving doors in accordance with claim 1, wherein:

said first fixed part of said device is secured to said body and said second part of said device is secured to said door of the piece of furniture.

12. The piece of furniture according to claim 11, wherein:

said door is a flap door with opening upwards or downwards with respect to said body of the piece of furniture and said device is applied to said piece of furniture with said first fixed part secured to a first vertical wall of said body, so that:

said moving plane of said articulated connection means is parallel to said first vertical wall and said elastic means and said kinematic connection means lie in a plane that is parallel to said horizontal walls of said body of the piece of furniture and positioned close to a first horizontal wall.

13. The piece of furniture according to claim 11, wherein:

said door is a door with side opening with respect to said body of the piece of furniture and said device is applied to said piece of furniture with said first fixed part secured to a first horizontal wall of said body, so that:

said moving plane of said articulated connection means is parallel to said first horizontal wall and said elastic means and said kinematic connection means lie in a plane that is parallel to said vertical walls of said body of the piece of furniture and positioned close to a first vertical wall.

14. The piece of furniture according to claim 11 wherein:

said device is at least partially housed in a box-shaped containment body and a hooking and adjusting means of said device project from a rear wall of said piece of furniture to act in correspondence with a wall structure to which the piece of furniture is secured.

15. The device according to claim 4, wherein said elastic means comprise a helical spring that acts between a first end tip and a second end tip.

16. The device according to claim 6, wherein said articulated joint is connected to said first lever arm of said rocker lever by means of a pin extended parallel to the rotation axis of said rocker lever and is connected to said connecting rod connection by means of a pin extended parallel to said first direction.

17. The device according to claim 8, wherein:

said articulated connection means comprise seven articulation pins and/or said articulated connection means comprise four articulated connecting rods.

* * * * *